US012050003B1

(12) United States Patent
Xu et al.

(10) Patent No.: US 12,050,003 B1
(45) Date of Patent: Jul. 30, 2024

(54) LED LAMP

(71) Applicant: SHENZHEN SNC OPTO ELECTRONIC CO., LTD., Guangdong (CN)

(72) Inventors: Jianyong Xu, Guangdong (CN); Shaohua Fu, Guangdong (CN); Zhengwen Huang, Guangdong (CN)

(73) Assignee: SHENZHEN SNC OPTO ELECTRONIC CO., LTD., Shenzhen (CN)

( * ) Notice: Subject to any disclaimer, the term of this patent is extended or adjusted under 35 U.S.C. 154(b) by 0 days.

(21) Appl. No.: 18/430,638

(22) Filed: Feb. 1, 2024

(30) Foreign Application Priority Data

Nov. 1, 2023 (CN) ......................... 202311442698.8

(51) Int. Cl.

| | |
|---|---|
| ***F21V 25/04*** | (2006.01) |
| ***F21V 17/00*** | (2006.01) |
| ***F21V 23/00*** | (2015.01) |
| ***F21V 29/507*** | (2015.01) |
| ***F21Y 115/10*** | (2016.01) |

(52) U.S. Cl.

CPC ............ *F21V 25/04* (2013.01); *F21V 17/002* (2013.01); *F21V 23/003* (2013.01); *F21V 29/507* (2015.01); *F21Y 2115/10* (2016.08)

(58) Field of Classification Search

CPC ...... F21V 25/04; F21V 29/507; F21V 17/002; F21V 23/003

See application file for complete search history.

(56) References Cited

U.S. PATENT DOCUMENTS

| | | | | |
|---|---|---|---|---|
| 9,206,948 | B1 * | 12/2015 | Scribante | H05B 47/11 |
| 9,279,553 | B1 * | 3/2016 | Scribante | F21V 23/02 |
| 9,453,639 | B2 * | 9/2016 | Mandy | B66B 11/0233 |
| 10,274,668 | B2 * | 4/2019 | Rashidi Doust | G02B 6/0088 |
| 11,274,821 | B2 * | 3/2022 | Danesh | F21V 5/04 |
| 11,536,421 | B1 * | 12/2022 | Wen | A01G 7/045 |
| 11,585,517 | B2 * | 2/2023 | Kopitzke | F21V 17/06 |
| 2005/0073838 | A1 * | 4/2005 | Haugaard | F21V 29/502 362/225 |
| 2012/0320627 | A1 * | 12/2012 | Araki | F21K 9/64 362/249.02 |
| 2014/0313775 | A1 * | 10/2014 | Myers | F21V 3/00 29/825 |
| 2015/0198310 | A1 * | 7/2015 | Scarlata | F21V 29/507 362/249.01 |

* cited by examiner

*Primary Examiner* — Bryon T Gyllstrom

(57) ABSTRACT

An LED lamp includes a heat dissipation lamp holder provided with a mounting groove on a front side thereof; an LED lamp panel mounted in the mounting groove; a driving power supply electrically connected to the LED lamp panel and configured to power the LED lamp panel; a switch assembly located on the heat dissipation lamp holder and electrically connected between the LED lamp panel and the driving power supply; and a lens plate located on a side of the LED lamp panel emitting light and capable of abutting against the switch assembly. The switch assembly disconnects the LED lamp panel from the driving power supply when the lens plate is separated from the switch assembly, and the switch assembly electrically connects the LED lamp panel and the driving power supply when the lens plate abuts against the switch assembly.

11 Claims, 5 Drawing Sheets

LED LAMP

CROSS-REFERENCE TO RELATED APPLICATIONS

This application claims priority of Chinese Patent Application No. 202311442698.8, filed on Nov. 1, 2023, entitled "LED LAMP", the entire content of which is incorporated herein in its entirety.

TECHNICAL FIELD

The present disclosure relates to lighting devices, and in particular to an LED lamp.

BACKGROUND

LED lamps have many advantages such as energy saving, environmental protection and long life, and have been widely used in various lighting places. In actual use, a lens plate needs to be replaced to convert different luminous effects. However, in the prior art, there are the following shortcomings when replacing the lens plate.

1) Since an LED lamp panel is connected to a power supply, an operator may be at risk of electric shock when replacing the lens plate.
2) Most of the existing lamp manufacturing technologies are fully fixed products. The components of the lamp are completely fixed in the factory. If the components of the lamp need to be replaced, the lamp needs to be disassembled in a multi-step process. The components fixed by screws need to be disassembled and assembled using tools, which is inconvenient and time-consuming. It is difficult to replace the lens plate of the LED lamp quickly and conveniently.

SUMMARY

Accordingly, it is necessary to provide an LED lamp that is safe and convenient for replacing a lens plate.

An LED lamp includes: a heat dissipation lamp holder provided with a mounting groove on a front side thereof; an LED lamp panel mounted in the mounting groove; a driving power supply electrically connected to the LED lamp panel and configured to power the LED lamp panel; a switch assembly located on the heat dissipation lamp holder and electrically connected between the LED lamp panel and the driving power supply; and a lens plate located on a side of the LED lamp panel emitting light and capable of abutting against the switch assembly. The switch assembly disconnects the LED lamp panel from the driving power supply when the lens plate is separated from the switch assembly, and the switch assembly electrically connects the LED lamp panel and the driving power supply when the lens plate abuts against the switch assembly.

Since the switch assembly is provided between the LED lamp panel and the driving power supply, and the switch assembly is pressed by the lens plate, when the LED lamp panel needs to be removed for maintenance or replacement, the lens plate is separated from the switch assembly, so that an internal circuit of the switch assembly is disconnected, thereby disconnecting the LED lamp panel from the driving power supply, and thus preventing human hands from getting an electric shock due to being in contact with the LED lamp panel.

In one of the embodiments, the LED lamp further includes a pressing frame assembly, the pressing frame assembly includes a pressing frame and a glass plate, and the pressing frame or the glass plate abuts against the lens plate.

In one of the embodiments, a side of the pressing frame assembly is hinged to the heat dissipation lamp holder, another side of the pressing frame assembly is connected to the heat dissipation lamp holder through a buckle, and the buckle is hinged to the heat dissipation lamp holder. The LED lamp can be assembled or repaired quickly and conveniently.

In one of the embodiments, the lens plate is a light-transmitting plate and covers the LED lamp panel.

In one of the embodiments, the switch assembly includes a box body, an electronic switch, and an elastic button, the electronic switch is fixedly mounted in the box body, both ends of the electronic switch are electrically connected to the driving power supply and the LED lamp panel, respectively, a side of the elastic button abuts against the lens plate, and another side of the elastic button faces the electronic switch. Since one side of the elastic button abuts against the lens plate, when the lens plate is removed, the lens plate is separated from the elastic button, so that the switch assembly disconnects the LED lamp panel from the driving power supply, thereby avoiding the electric shock caused by human hands being in contact with the LED lamp panel due to the fact that the LED lamp panel is not powered off in conventional structure.

In one of the embodiments, the lens plate is provided with a first pressing post corresponding to the elastic button, the switch assembly is located on a back side of the LED lamp plate, the LED lamp panel is provided with a through hole corresponding to the first pressing post, and the first pressing post extends through the through hole and abuts against the switch assembly. Such arrangement can make the structure of the lamp body compact, and the switch assembly will not block the LED lamp panel, so that the light-emitting area is larger.

In one of the embodiments, the LED lamp panel is provided with a positioning hole, the lens plate is provided with a positioning post corresponding to the positioning hole, and the positioning post is inserted into the positioning hole. When mounting the lens plate, the lens plate can be pre-positioned and mounted by inserting the positioning post into the positioning hole, and then pressing the lens plate through the pressing frame assembly, so that there is no need to fix the lens plate with multiple screws as in the conventional structure, and the lens plate can be assembled or disassembled quickly and conveniently.

In one of the embodiments, the heat dissipation lamp holder includes walls enclosing the mounting groove, the switch assembly and the LED lamp panel are both surrounded by the walls, the LED lamp further includes a pressing frame assembly, the pressing frame assembly includes a pressing frame and a glass plate, a sealing ring is provided between the glass plate and the pressing frame, and the sealing ring is sealingly connected to the wall. Both the switch assembly and the LED lamp panel can achieve a good waterproof effect.

In one of the embodiments, a protruding ring is provided on a light emitting surface of the lens plate, and the protruding ring abuts against the glass plate. Since the positioning post is inserted into the positioning hole and the protruding ring abuts against the glass plate, the lens plate can be prevented from loosening in a left-right direction and a front-rear direction, respectively, thereby achieving the effect of fixing the lens plate through screws as in the conventional structure.

An LED lamp includes: a heat dissipation lamp holder provided with a mounting groove on a front side thereof; an LED lamp panel mounted in the mounting groove; a driving power supply electrically connected to the LED lamp panel and configured to power the LED lamp panel; a switch assembly electrically connected between the LED lamp panel and the driving power supply and provided on the heat dissipation lamp holder; and a pressing frame assembly located on a side of the LED lamp panel emitting light and capable of abutting against the switch assembly. The switch assembly disconnects the LED lamp panel from the driving power supply when the pressing frame assembly is separated from the switch assembly, and the switch assembly electrically connects the LED lamp panel and the driving power supply when the pressing frame assembly abuts against the switch assembly.

In one of the embodiments, the pressing frame assembly includes a second pressing post, the switch assembly is located on a back side of the LED lamp plate, the LED lamp panel is provided with a through hole corresponding to the second pressing post, and the second pressing post extends through the through hole and abuts against the switch assembly.

When repairing the LED lamp, there is no risk of electric shock caused by being in contact with the powered LED lamp panel, on the other hand, the lens plate can be assembled or disassembled quickly and conveniently.

These and other features of the present disclosure will become readily apparent upon further review of the following specification and drawings.

BRIEF DESCRIPTION OF THE DRAWINGS

The drawings are only for illustrative purposes and represent only schematic views rather than actual drawings, which cannot be understood as limitations of the present disclosure. In order to better illustrate the embodiments of the present disclosure, some components in the drawings may be omitted, enlarged or reduced, which does not represent the size of the actual product. For those skilled in the art, some well-known structures in the drawings and the descriptions thereof may be omitted.

REFERENCE SIGNS

Figure 1:
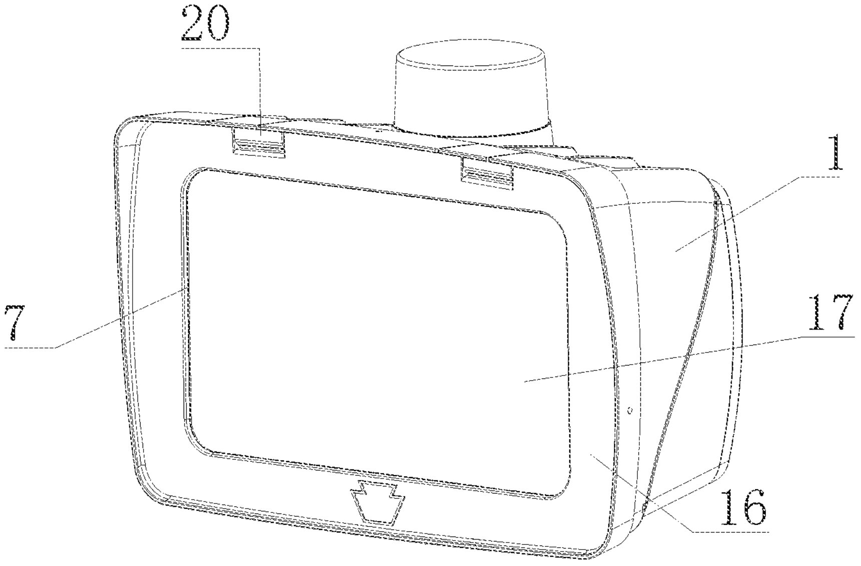
FIG. 1 is a perspective view of an LED lamp according to a first embodiment.
Figure 2:
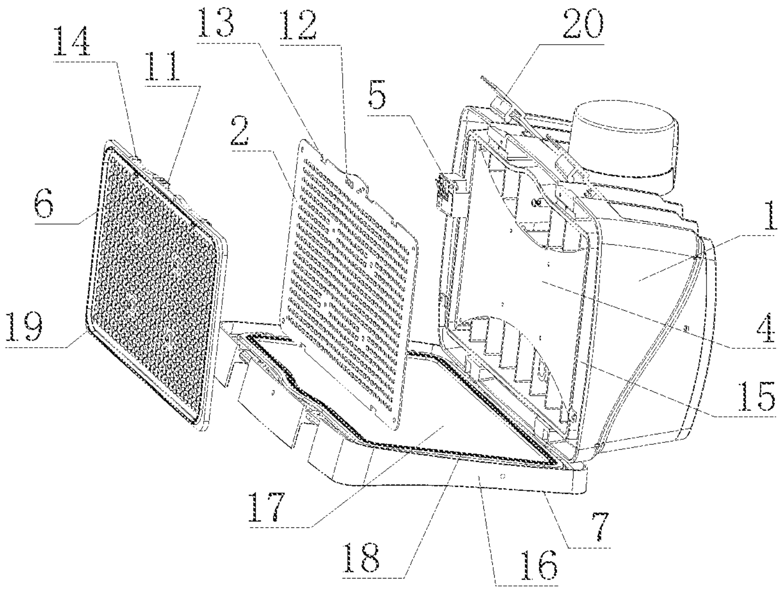
FIG. 2 is an exploded view of the LED lamp of FIG. 1.
Figure 3:
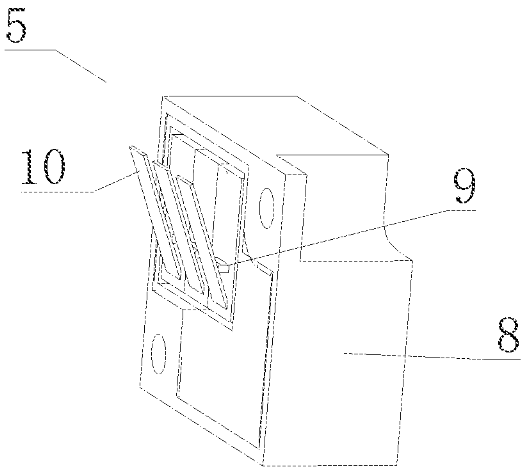
FIG. 3 is a perspective view of a switch assembly shown in FIG. 2.
Figure 4:
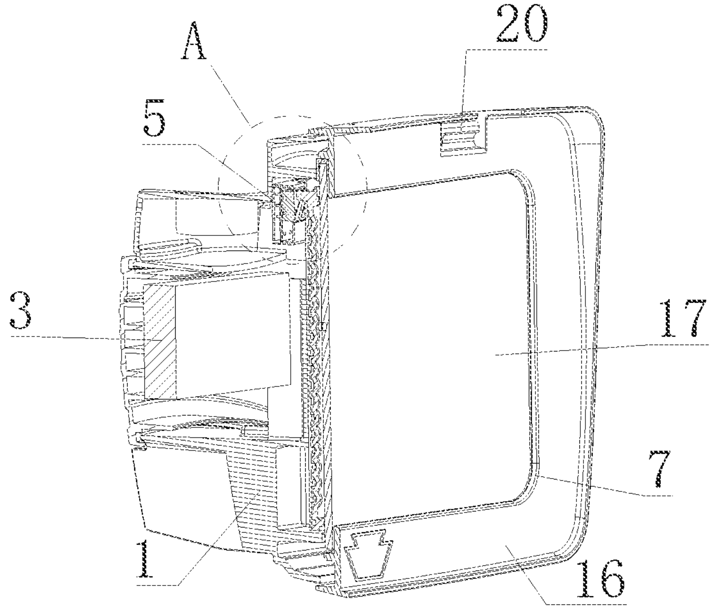
FIG. 4 is a cross-sectional view of the LED lamp of FIG. 1.
Figure 5:
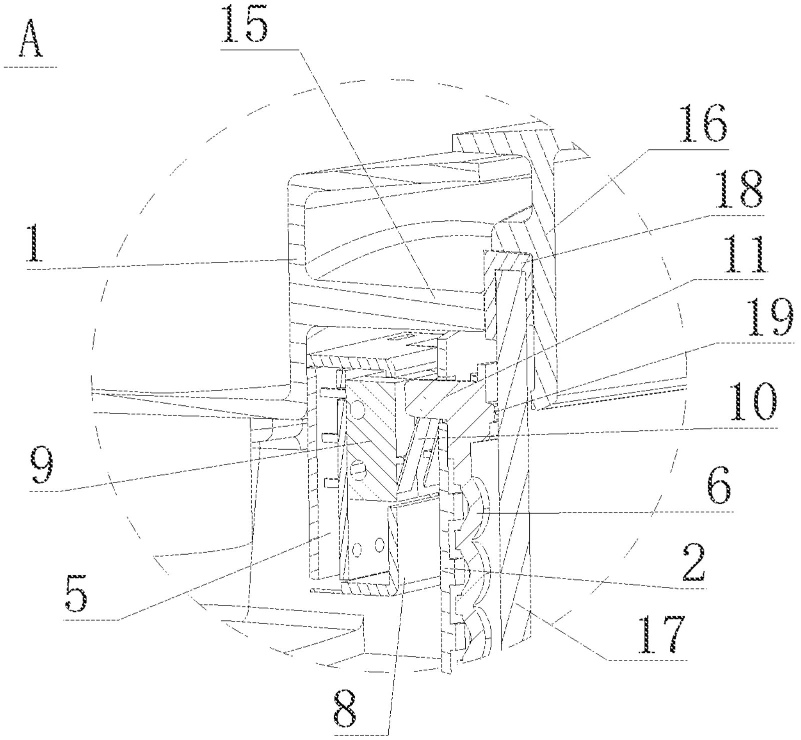
FIG. 5 is an enlarged view of portion A of FIG. 4.
Figure 6:
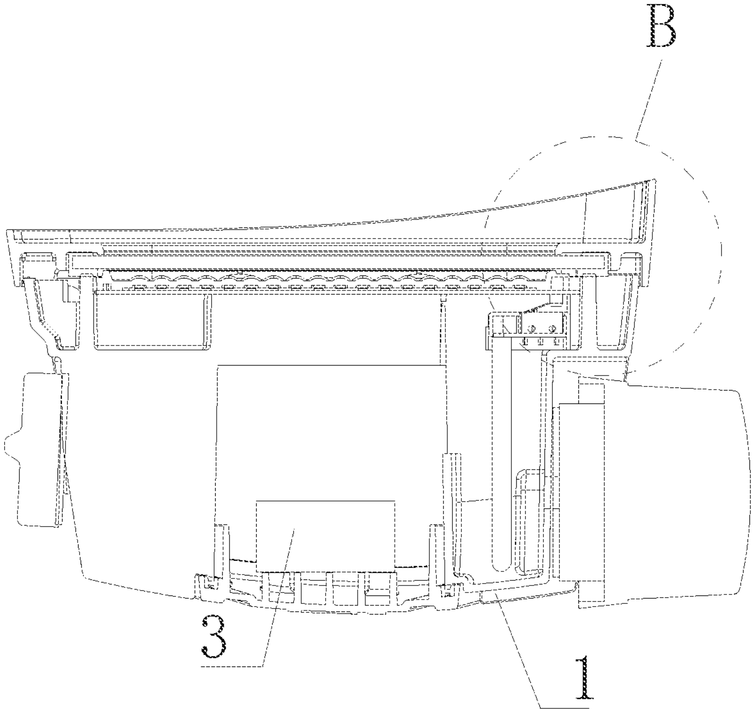
FIG. 6 is another cross-sectional view of the LED lamp of FIG. 1.
Figure 7:
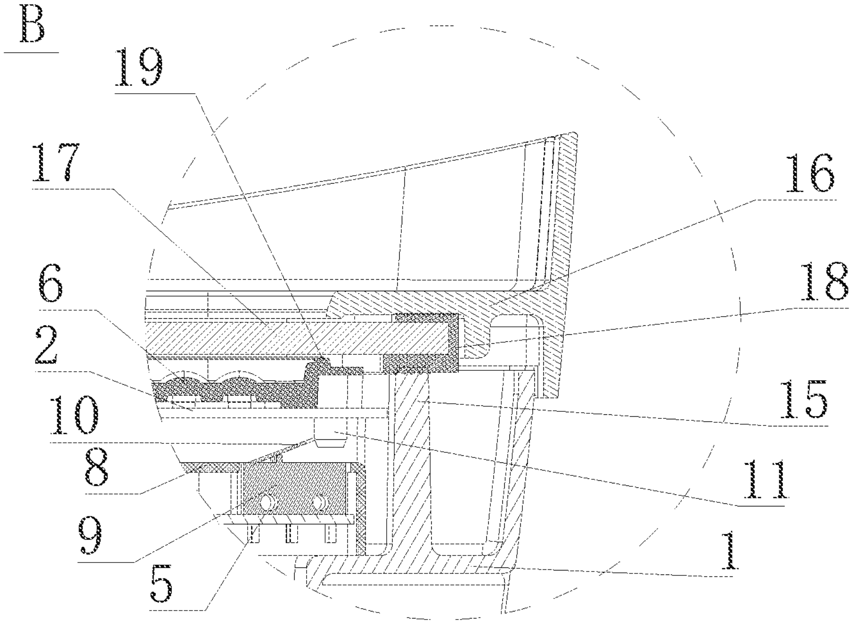
FIG. 7 is an enlarged view of portion B of FIG. 6.

1. Heat dissipation lamp holder; 2. LED lamp panel; 3. Driving power supply; 4. Mounting groove; 5. Switch assembly; 6. Lens plate; 7. Pressing frame assembly; 8. Box body; 9. Electronic switch; 10. Elastic button; 11. First pressing post; 12. Through hole; 13. Positioning hole; 14. Positioning post; 15. wall; 16. Pressing frame; 17. Glass plate; 18. Sealing ring; 19. Protruding ring; 20. Buckle; 21. Second pressing post.

DETAILED DESCRIPTION OF THE EMBODIMENTS

In the drawings of the embodiments of the present disclosure, the same or similar numbers correspond to the same or similar components. In the description of the present disclosure, it should be understood that terms "upper", "lower", "front" and "rear", "left", "right", "vertical", "horizontal", "lateral", "longitudinal", "top", "bottom", "inner", "outer", and other indicated orientation or positional relationships are based on the orientation or positional relationship shown in the drawings for convenience and simplicity of description of the present disclosure only, and not as an indication or implication that the devices or elements referred to must have or be constructed or operated in a specific orientation. Therefore, the terms describing positional relationships in the drawings are only for illustrative purposes and should not be construed as limitations of the present disclosure.

Referring to FIGS. 1 to 7, an LED lamp according to a first embodiment is provided, including a heat dissipation lamp holder 1, an LED lamp panel 2, a driving power supply 3, and a switch assembly 5. The driving power supply 3 is configured to power the LED lamp panel 2. A front side of the heat dissipation lamp holder 1 is provided with a mounting groove 4, and the LED lamp panel 2 is mounted in the mounting groove 4. The switch assembly 5 is electrically connected between the LED lamp panel 2 and the driving power supply 3. The switch assembly 5 is located on the heat dissipation lamp holder 1. The LED lamp further includes a cover member located on a side of the LED lamp panel 2 emitting light. In this embodiment, the cover member is a lens plate 6 having a lens structure. The lens plate 6 is capable of abutting against the switch assembly 5. When the lens plate 6 is in an open state, that is, when the lens plate 6 is separated from the switch assembly 5, the switch assembly 5 disconnects the LED lamp panel 2 from the driving power supply 3. When the lens plate 6 is in a closed state, that is, when the lens plate 6 abuts against the switch assembly 5, the switch assembly 5 electrically connects the LED lamp panel 2 and the driving power supply 3.

Since the switch assembly 5 is provided between the LED lamp panel 2 and the driving power supply 3, and the switch assembly 5 is pressed by the lens plate 6, when the LED lamp panel 2 needs to be removed for maintenance or replacement, the lens plate 6 is separated from the switch assembly 5, so that an internal circuit of the switch assembly 5 is disconnected, thereby disconnecting the LED lamp panel 2 from the driving power supply 3, and thus preventing human hands from getting an electric shock due to being in contact with the LED lamp panel 2.

In the embodiment, the LED lamp further includes a pressing frame assembly 7, which is hinged to the heat dissipation lamp holder 1 and abuts against the lens plate 6.

The switch assembly 5 includes a box body 8, an electronic switch 9, and an elastic button 10. The electronic switch 9 is fixedly mounted in the box body 8. Both ends of the electronic switch 9 are electrically connected to the driving power supply 3 and the LED lamp panel 2, respectively. One side of the elastic button 10 abuts against the lens plate 6, at this time, the electronic switch 9 is in an electrical conduction state, and the other side of the elastic button 10 faces the electronic switch 9. Since one side of the elastic button 10 abuts against the lens plate 6, when the lens plate 6 is removed, the lens plate 6 is separated from the elastic button 10, so that the switch assembly 5 disconnects the LED lamp panel 2 from the driving power supply 3, thereby avoiding the electric shock caused by human hands being in contact with the LED lamp panel 2 due to the fact that the LED lamp panel 2 is not powered off in conventional structure.

The lens plate 6 is provided with a first pressing post 11 corresponding to the elastic button 10. The switch assembly 5 is located on a back side of the LED lamp panel 2, that is, the switch assembly 5 is located on a side of the LED lamp panel 2 opposite to the light emitting direction. The LED lamp panel 2 is provided with a through hole 12 corresponding to the first pressing post 11, and the first pressing post 11 extends through the through hole 12 and abuts against the switch assembly 5. Such arrangement can make the structure of the lamp body more compact, and the switch assembly 5 will not shield the LED lamp panel 2, so that the light-emitting area is larger.

The LED lamp panel 2 is provided with a plurality of positioning holes 13, the lens plate 6 is provided with a plurality of positioning posts 14 corresponding to the positioning holes 13, and the positioning posts 14 are inserted into the positioning holes 13. When mounting the lens plate 6, the lens plate 6 can be pre-positioned by inserting the positioning posts 14 into the positioning holes 13, and then the lens plate 6 is pressed by the pressing frame assembly 7, so that there is no need to fix the lens plate 6 with multiple screws as in the conventional structure, and the lens plate 6 can be assembled or disassembled quickly and conveniently without the need for mounting tools such as screwdrivers.

The heat dissipation lamp holder 1 includes walls 15 enclosing the mounting groove 4. The switch assembly 5 and the LED lamp panel 2 are both surrounded by the walls 15. The pressing frame assembly 7 includes a pressing frame 16 and a glass plate 17. A sealing ring 18 is provided between the glass plate 17 and the pressing frame 16, and the sealing ring 18 is sealingly connected to the walls 15. In this way, both the switch assembly 5 and the LED lamp panel 2 can achieve a good waterproof effect.

A protruding ring 19 is provided on a light emitting surface of the lens plate 6, and the protruding ring 19 abuts against the glass plate 17. Since the positioning post 14 is inserted into the positioning hole 13 and the protruding ring 19 abuts against the glass plate 17, the lens plate 6 can be prevented from loosening in a left-right direction and a front-rear direction, respectively, thereby achieving the effect of fixing the lens plate 6 through screws as in the conventional structure.

One side of the pressing frame 6 is hinged to the heat dissipation lamp holder 1, and the other side of the pressing frame 6 is connected to the heat dissipation lamp holder 1 through a buckle 20, and the buckle 20 is hinged to the heat dissipation lamp holder 1. The lens plate 6 can be quickly disassembled or assembled using the buckle 20 without additional tools, and the LED lamp can be assembled or repaired quickly and conveniently.

Figure 8:
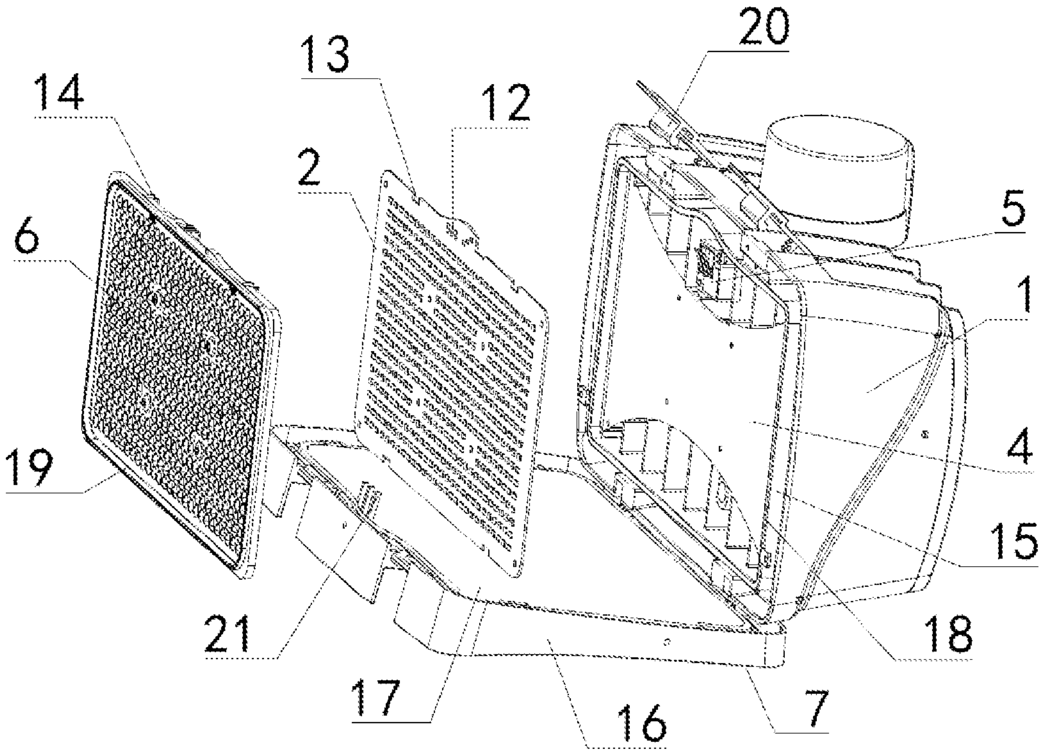
FIG. 8 is an exploded view of an LED lamp according to a second embodiment.

Referring to FIG. 8, an LED lamp according to a second embodiment is generally similar to that of the first embodiment. The difference lies mainly in that the cover member is the pressing frame assembly 7. The pressing frame assembly 7 includes the pressing frame 16 and the glass plate 17. A side of the pressing frame 16 facing the LED lamp panel 2 is provided with a second pressing post 21, the LED lamp panel 2 is provided with a through hole 12 corresponding to the second pressing post 21, and the second pressing post 21 extends through the through hole 12 and abuts against the switch assembly 5.

The beneficial effects of the LED lamp are as follows: when repairing the LED lamp, there is no risk of electric shock caused by being in contact with the powered LED lamp panel 2, on the other hand, the lens plate 6 can be assembled or disassembled quickly and conveniently.

The above-mentioned embodiments do not constitute a limitation on the protection scope of the technical solution. Any modifications, equivalent replacements and improvements made within the spirit and principles of the above-mentioned embodiments shall be included within the protection scope of this technical solution.

The foregoing descriptions are merely specific embodiments of the present disclosure, but are not intended to limit the protection scope of the present disclosure. Any variation or replacement readily figured out by a person skilled in the art within the technical scope disclosed in the present disclosure shall all fall within the protection scope of the present disclosure.

What is claimed is:

1. An LED lamp, comprising:

a heat dissipation lamp holder provided with a mounting groove on a front side thereof;

an LED lamp panel mounted in the mounting groove;

a driving power supply electrically connected to the LED lamp panel and configured to power the LED lamp panel;

a switch assembly located on the heat dissipation lamp holder and electrically connected between the LED lamp panel and the driving power supply; and a lens plate located on a side of the LED lamp panel emitting light and capable of abutting against the switch assembly;

wherein the switch assembly disconnects the LED lamp panel from the driving power supply when the lens plate is separated from the switch assembly, and the switch assembly electrically connects the LED lamp panel and the driving power supply when the lens plate abuts against the switch assembly.

2. The LED lamp according to claim 1, further comprising a pressing frame assembly, wherein the pressing frame assembly comprises a pressing frame and a glass plate, and the pressing frame or the glass plate abuts against the lens plate.

3. The LED lamp according to claim 2, wherein a side of the pressing frame is hinged to the heat dissipation lamp holder, another side of the pressing frame is connected to the heat dissipation lamp holder through a buckle, and the buckle is hinged to the heat dissipation lamp holder.

4. The LED lamp according to claim 1, wherein the lens plate is a light-transmitting plate and covers the LED lamp panel.

5. The LED lamp according to claim 1, wherein the switch assembly comprises a box body, an electronic switch, and an elastic button, the electronic switch is fixedly mounted in the box body, both ends of the electronic switch are electrically connected to the driving power supply and the LED lamp panel, respectively, a side of the elastic button abuts against the lens plate, and another side of the elastic button faces the electronic switch.

6. The LED lamp according to claim 5, wherein the lens plate is provided with a first pressing post corresponding to the elastic button, the switch assembly is located on a back side of the LED lamp plate, the LED lamp panel is provided with a through hole corresponding to the first pressing post, and the first pressing post extends through the through hole and abuts against the switch assembly.

7. The LED lamp according to claim 6, wherein the LED lamp panel is provided with a positioning hole, the lens plate is provided with a positioning post corresponding to the positioning hole, and the positioning post is inserted into the positioning hole.

8. The LED lamp according to claim 1, wherein the heat dissipation lamp holder comprises walls enclosing the mounting groove, the switch assembly and the LED lamp panel are both surrounded by the walls, the LED lamp further comprises a pressing frame assembly, the pressing frame assembly comprises a pressing frame and a glass plate, a sealing ring is provided between the glass plate and the pressing frame, and the sealing ring is sealingly connected to the wall.

9. The LED lamp according to claim 8, wherein a protruding ring is provided on a light emitting surface of the lens plate, and the protruding ring abuts against the glass plate.

10. An LED lamp, comprising:

a heat dissipation lamp holder provided with a mounting groove on a front side thereof;

an LED lamp panel mounted in the mounting groove;

a driving power supply electrically connected to the LED lamp panel and configured to power the LED lamp panel;

a switch assembly electrically connected between the LED lamp panel and the driving power supply and provided on the heat dissipation lamp holder; and a pressing frame assembly located on a side of the LED lamp panel emitting light and capable of abutting against the switch assembly;

wherein the switch assembly disconnects the LED lamp panel from the driving power supply when the pressing frame assembly is separated from the switch assembly, and the switch assembly electrically connects the LED lamp panel and the driving power supply when the pressing frame assembly abuts against the switch assembly.

11. The LED lamp according to claim 10, wherein the pressing frame assembly comprises a second pressing post, the switch assembly is located on a back side of the LED lamp plate, the LED lamp panel is provided with a through hole corresponding to the second pressing post, and the second pressing post extends through the through hole and abuts against the switch assembly.

* * * * *